(12) United States Patent
Gannon et al.

(10) Patent No.: US 8,120,615 B2
(45) Date of Patent: Feb. 21, 2012

(54) SYSTEM AND METHOD FOR GENERATING TERRAIN REPRESENTATION

(75) Inventors: Aaron Gannon, Anthem, AZ (US); Jeffrey M. Rye, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1171 days.

(21) Appl. No.: 11/801,372

(22) Filed: May 9, 2007

(65) Prior Publication Data

US 2008/0278515 A1  Nov. 13, 2008

(51) Int. Cl.
*G09G 5/02* (2006.01)

(52) U.S. Cl. ............... 345/593; 345/440; 345/440.1; 342/65; 701/4; 701/9

(58) Field of Classification Search .......... None
See application file for complete search history.

(56) References Cited

U.S. PATENT DOCUMENTS

| 6,268,858 | B1 * | 7/2001 | Nathman et al. | 345/419 |
| 6,448,969 | B1 | 9/2002 | Minakawa et al. | |
| 2004/0085319 | A1 * | 5/2004 | Gannon | 345/440 |
| 2005/0104884 | A1 * | 5/2005 | Iwata et al. | 345/440 |

FOREIGN PATENT DOCUMENTS

| EP | 0341645 A2 | 11/1989 |
| GB | 2233197 A | 1/1991 |

OTHER PUBLICATIONS

International Search Report mailed Jul. 12, 2010, for Application No. PCT/US2008/063023, filed Aug. 5, 2008.

* cited by examiner

*Primary Examiner* — Antonio A Caschera
(74) *Attorney, Agent, or Firm* — Ingrassia Fisher & Lorenz, P.C.

(57) ABSTRACT

A method and system for generating a representation of a terrain. The method of generating a representation of a terrain comprises the steps of selecting a set of colors, the colors comprise at least a plurality of colors, determining a minimum terrain elevation, and determining a maximum terrain elevation. A plurality of terrain bands is computed based in part on the set of colors, the minimum terrain elevation, and the maximum terrain elevation. At least one of the limited set of colors is assigned to each of the plurality of the plurality of terrain bands. The representation of the terrain is generated one of the limited set of colors.

20 Claims, 3 Drawing Sheets

SYSTEM AND METHOD FOR GENERATING TERRAIN REPRESENTATION

BACKGROUND

1. Field of the Invention

The present application is generally directed to a system and method for generating a terrain representation. More specifically, the present application is generally directed to a system and method for generating a terrain representation that, in one arrangement, utilizes at least a plurality of dynamic color bands, each band representing a certain band or level of terrain elevation. In this manner, either a static or dynamic visual map may be provided of a terrain over which a vehicle is passing, such as an aircraft. However, aspects of the invention may be equally applicable in other scenarios as well.

2. Description of Related Art

In the navigation of an aircraft or other type of vehicle (land, water, air, etc.) traveling over some type of planned route, such as an air route, contour or terrain maps are typically relied upon to represent terrain configurations over which the vehicle passes. Ordinarily, a pilot or perhaps some other crew member of the aircraft utilizes certain data provided by such contour maps in conjunction with instrument readings and/or visual observations of the terrain. Such contour maps and associated geographical data may be used in determining an altitude and/or course of the vehicle or aircraft as the vehicle or aircraft passes from point to point along such a planned or designated planned route.

Methods and systems for generating terrain representations are generally known. Certain known methods and systems for generating terrain representations ordinarily utilize a large number of colors to represent differing terrain elevations. For example, in certain systems that are utilized to represent absolute terrain height of planet earth oftentimes utilize a total of up to thirty-two (32) different colors. Using such systems that rely on a large number of different colors oftentimes present certain complications.

As just one illustration, when using such a large number of colors to represent absolute height of a certain terrain (such as planet earth), elevation differences may tend to be artificially accentuated when there is a hue shift in displayed colors. In other words, there could be a deminimus elevation difference of perhaps one thousand feet that may be represented by a hue shift in color as the colors are displayed. Such known methods and systems may utilize two different hues to represent a mere difference of one thousand feet in elevation in one case. In another case, such known methods and systems may use only one hue (with saturation and luminance differences) to represent the same altitude variation. For instance, in the situation where 30,000 feet of elevation is represented by 32 colors, the lower 16 of these colors use a green hue, plus a change in saturation and luminance to differentiate among colors and add gradient to the terrain visualization. The higher 16 of these colors use a brown hue, plus a change in saturation and luminance to differentiate among colors and add gradient to the terrain visualization. At the midpoint of the elevations represented, i.e., 15,000 feet, the hue shifts from green to brown.

Consider, in one instance, where an aircraft is flying at 7,000 feet, with the highest altitude in display view at 7,500 feet, and the lowest altitude in display view at 6,500 feet. In the case where two colors are being used to characterize the 1,000 feet in altitude variation, both colors would be within a green hue. The difference in elevations will be portrayed using a change in saturation and luminance, while the hue largely remains the same, i.e., that is, the hue remains green. Now in the situation where an aircraft is flying at 15,000 feet, assume that the highest altitude in display view will be at 15,500 feet and the lowest altitude in display view will be at 14,500 feet. Again, if two colors are being used to characterize the 1,000 feet in altitude variation, but now because the altitudes displayed are at the point where the hue shift (from green to brown) occurs, the 1,000 feet of altitude variation in the second case will be portrayed with a greater degree of emphasis (green to brown shift) than the 1,000 feet of altitude variation in the first case (green hue only). Because there are many altitudes to represent and differentiate, it is frequently the case that the green and brown hues are used, and consequently, where the split between the hues occurs, the altitude variation may tend to be over-emphasized.

Another concern that can often arise with certain known systems having a large number of different hues is that such systems tend to raise the possibility of conflicting colors when new data sets are overlain on the terrain colors. For instance, if hues in addition to green and brown are used (perhaps in an attempt to evenly distribute more hue shifts across the terrain elevations), the new colors selected for the background terrain can easily conflict with critical foreground symbology. For instance, magenta, red, yellow, and cyan already have meanings associated with foreground symbology in aircrafts. As such, as colors in the background terrain approach the colors in the foreground symbology, important elements of the foreground symbology may blend with the background and become hidden or confusing to interpret.

There is, therefore, a general need for a system and/or method that minimizes the number of different colors or hues that may be used for certain terrain representations, such as a representation of the earth's terrain. There is also a general need for a system and method of generating terrain representations that does not generate representations that are artificially accentuated when there is a hue shift in color.

There is also a general need for a system and method of generating terrain representations that does not create conflicting colors when new data sets are overlain on the terrain colors. That is, there is a need for a system and method that utilizes background colors that are not similar to foreground colors. Because a good number of foreground colors are already in use, the hues available for background colors should be limited. At the same time, there is a need to fully represent the absolute altitude variations in the field of view of a display.

In a current generation of an Enhanced Ground Proximity Warning System, a "Peaks" mode exists to portray absolute terrain. However, the "Peaks" mode does not necessarily show all terrain, but rather represents the high terrain in several bands when the aircraft is at a cruise altitude. A method that represents all absolute terrain in the zoom view of the map, while at the same time using a minimum amount of colors for that full representation, and consequently allowing easy integration of colors from other map layers (for instance, relative terrain to the aircraft shown as green, yellow, and red bands), would provide certain advantages for situational awareness and system usability.

Minimizing the use of color may also be advantageous for preserving the meaning of the color, reducing color conflicts among data sets, as well as creating a simpler display overall. It would be useful to develop a terrain coloration model that minimizes the use of color while giving a member of a flight crew (e.g., a pilot) adequate resolution between terrains of different heights. Ideally, the color model should present finer terrain color resolution when zoomed in (i.e., when viewing details), and coarser terrain color resolution when zoomed out (i.e., when viewing an overall picture).

SUMMARY

According to an exemplary arrangement, a method of generating a representation of a terrain comprises the steps of selecting a set of colors, the colors comprise at least a plurality of colors, determining a minimum terrain elevation, and determining a maximum terrain elevation. A plurality of terrain bands is computed based in part on the set of colors, the minimum terrain elevation, and the maximum terrain elevation. At least one of the limited set of colors is assigned to each of the plurality of the plurality of terrain bands. The representation of the terrain is generated one of the limited set of colors.

In an alternative arrangement, a system for of generating a representation of a terrain, the system comprises a set of selected colors, the set of colors comprising at least a plurality of colors. A computer calculates a minimum terrain elevation and a maximum terrain elevation. The computer also computes a plurality of terrain bands based in part on the set of colors, the minimum terrain elevation, and the maximum terrain elevation. At least one of the limited set of colors is assigned to each of the plurality of terrain bands. The system generates the representation of the terrain utilizing at least one of the limited set of colors.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments are described herein with reference to the drawings, in which.

DETAILED DESCRIPTION

In one preferred arrangement, the present method and system utilizes a limited color set each specific color within the color set is assigned a specific terrain altitude band. In one preferred arrangement, a limited color set of about 5 to about 10 colors, preferably a color set of 8 colors may be utilized. For example, a terrain altitude band for 500 to 1000 feet above ground level ("AGL") may be assigned the color light tan. Each band has a lower or base value and a higher or top value, the difference between these two values being the width of elevation represented by the color. For example, the above mentioned light tan terrain altitude band represents a band of 500 feet, where the lower or base value is 500 feet and the higher or top value is 1000 feet.

The terrain representation or terrain band assigned to a given color is preferably not a static representation but rather a dynamic representation. That is, the terrain representation is dynamic and may be a function of either time, elevation, aircraft speed, and/or perhaps some other similar operating characteristic. Preferably, each system terrain representation or terrain altitude band is dynamic: the altitude band is alterable and allowed to stretch and/or compress as a function of the system representation used, and/or the terrain variation, and/or some other operating parameter.

For example, in one arrangement, the dynamic nature of each terrain representation or terrain band is based, in part, on a zoom or range level that may be selected by a user (such as a flight crew member) and is presently visible on a display. For instance, a pilot may have a lateral map display that is zoomed or ranged to a 100 mile by 100 mile square of area of terrain in interest. Within this area of interest, the terrain may vary in altitude from 5,000 feet to 15,000 feet. In this situation, 5,000 feet is a minimum altitude, and 15,000 feet is a maximum altitude that must be portrayed by the display, and the variability of terrain to be displayed is 10,000 feet.

Figure 1:
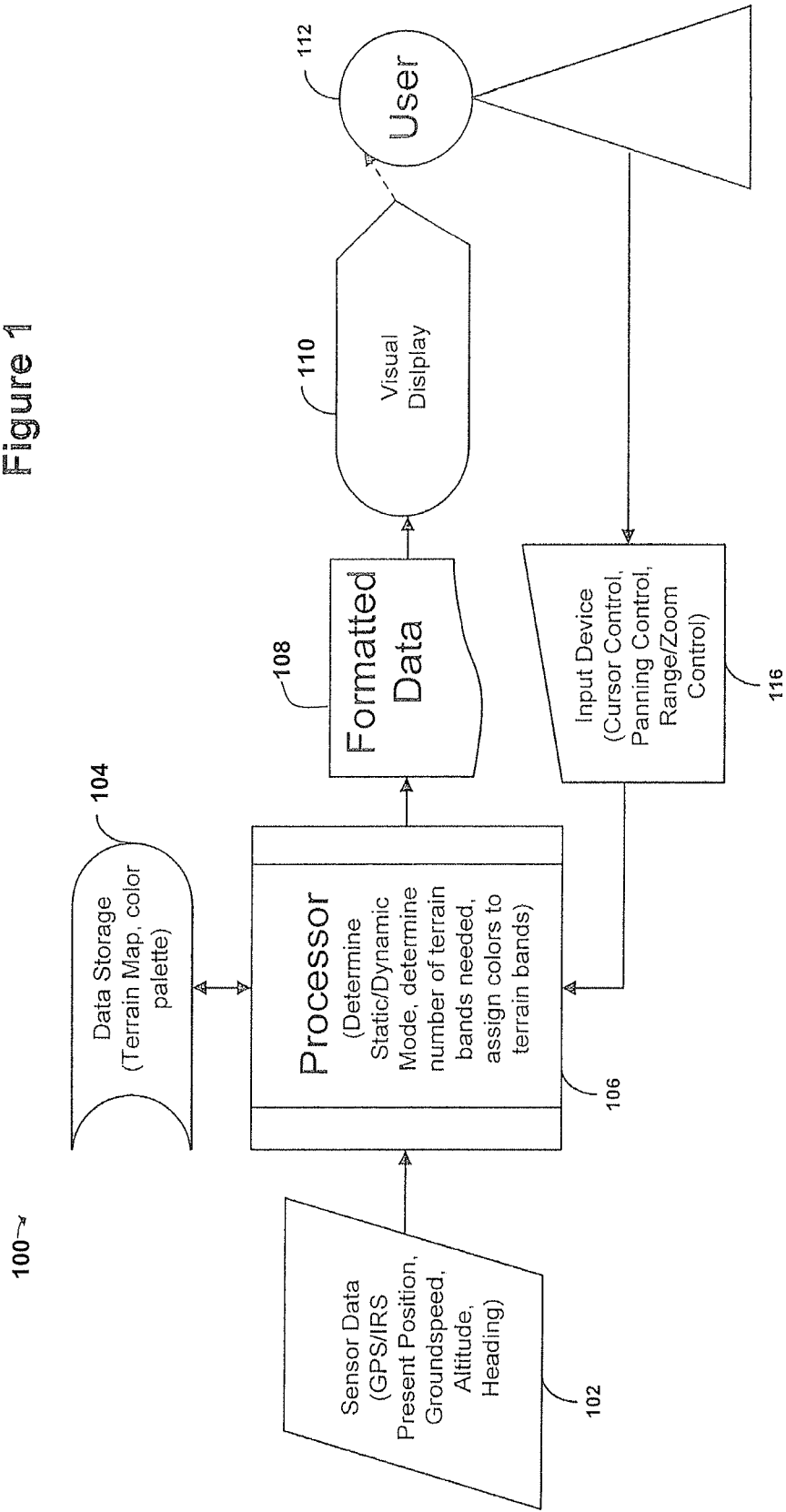
FIG. 1 illustrates a system architecture of a terrain generation system according to one aspect of the present invention.

FIG. 1 illustrates an exemplary system architecture of a terrain generation system according to one aspect of the present invention. In one preferred arrangement, all such elements of this exemplary system architecture may be provided on or in a vehicle or aircraft. However, those of ordinary skill in the relevant art will note that further modifications and/or changes may be made within the spirit and/or scope of the present application.

FIG. 1 includes a system architecture 100 that includes sensor data 102, data storage 104, a processor 106, formatted data 108, a visual display 110, a user or operator 112, and an input device 116 (such as a cockpit Cursor Control Device, with a function similar to a mouse for a PC or other similar type of human interface device that may be used or manipulated to input data).

As can be seen from FIG. 1, both data storage 104 and sensor data is provided to processor 106. More specifically, data storage 104 may store terrain map data and color palette data and provides this data to processor 106. Sensor data 102, which includes various types of positioning or characteristic data such as (but not limited to) GPS/IRS, present position, groundspeed, altitude and heading type data, also provides this data to processor 106. Processor 106, with input information from both data storage 104, sensor data 102, and input device 116, manipulates and processes this data. Such data may be used to determine the static or dynamic mode of the system (as described in greater detail below), to determine the number of terrain bands, and/or used to assign the colors to the terrain band. Processor 106 may also provide feedback to data storage 104.

The various types of data processed by processor 106 is provided as formatted data 108. This formatted data 108 is then displayed by the visual display 110. The visual display 110 may either be provided on or in a vehicle or, alternatively, it may be provided at a remote location (such as, for example, a command center). The formatted data 108 that is provided on the visual display 110 is then viewed by an operator or user 112, who, via input device 116 (and as described in greater detail below), may alter and/or change the overall operating characteristics of system 100. The input device 116 provides for cursor control, panning control, range and/or zoom control.

The user or operator 112 (pilot or other crew member) may zoom, or range in on the landform such that now a 10 mile by 10 mile square of terrain now fully consumes the same amount of display space on visual display 110 previously devoted to the 100 mile by 100 mile square of terrain. This may be accomplished by manipulating the input device or human interface device 110. If in this 10 mile by 10 mile square area of interest, the terrain only varies from 7,500 to 12,500 feet, the variability of terrain to be displayed will now be reduced to 5,000 feet. In one arrangement of the present system, the system 100 can be designed to use a minimal number of colors (in this example eight colors), and so in the case of the 10,000 feet of variability, the system 100 assigns the colors to evenly represent the altitude variability. Likewise, in the case of 5,000 feet of variability, the system 100 could re-assign the colors to again evenly represent the altitude variability. In the former case, the color bands can be said to be expanded, and in the later case, the color bands could be said to be compressed. In one arrangement, such color reassignment and/or color band expansion may be accomplished via the processor 106.

In addition to the map range determining the spread of color over the terrain bands, in an alternative arrangement, the aircraft speed and/or its predicted position via the sensor data may be used to calculate what a future view of the map would be. This may be determined by the sensor data 102 provided to the processor 106. For example, if it is assumed that the aircraft is moving from a first area of interest (i.e., a map view with aircraft centered in the map) where there is 10,000 feet of altitude variation, and toward a second area of interest (i.e., a map view with aircraft centered in the map) where there is 5,000 feet of altitude variation. The terrain bands, and the colors used to define these terrain bands, must compress dynamically as the vehicle or aircraft moves from the first area of interest to the second area of interest to represent a change (if any) in the altitude represented in the map. In one arrangement of the present invention, the system 100 stores the future area in memory, preferably in data storage 104. The system 100 can then calculate an average rate of change for the color bands to smoothly transition over time from representing 10,000 feet of altitude variation to 5,000 feet of altitude variation.

With respect to the presently disclosed arrangements, the following definitions and assumptions may be utilized for clarification:

MAX: Maximum terrain elevation in the present view;
MIN: Minimum terrain elevation in the present view;
MID: Midpoint terrain elevation in the present view. The Midpoint terrain elevation in view MID may be defined as being equal to (MAX+MIN)/2;
NBD: Number of color bands displayed in the present view;
Band #: Identifies a particular terrain band (or a specific range of elevations), where # may be replaced by a number. In one preferred arrangement, this number is selected from the group of eight numbers ranging from 0-7;
Color #: Identifies a particular color, where # is replaced by a number. In one preferred arrangement, this number is selected from a group of eight numbers ranging from 0-7.

In the general discussion provided below, examples will be provided as to generating a terrain representation of the planet earth. However, the present invention may be used for any type of terrain representation.

In addition, in the general discussion below, the lowest elevation point occurring along the earth's surface will be assumed to be approximately (1,312) feet below sea level: this occurs at the Dead Sea. Also, for purposes of the present discussion, consider that the highest elevation point on earth is approximately +29,035 feet above sea level at the peak of Mount Everest. Therefore, the difference between the earth's lowest elevation point (1,312) and the earth's highest elevation point +29,035 represents a total elevation variation of 30,347 feet over the entire earth's surface. In one arrangement, to remove the sign error from the sub-sea level elevations, the earth's lowest elevation point (1,312) is set to a minimum reference elevation of 0. Similarly, the earth's highest elevation point +29,035 peak is set to a maximum reference elevation of 30,347 feet for the present discussion. Therefore, under such a scenario, a minimum terrain elevation in view or a MIN value will not be less than 0 feet. Consequently, a maximum terrain elevation in view or a MAX value may, in certain circumstances, extend to a maximum elevation value of 30,347 feet.

In one preferred arrangement, a chosen color set of dynamic elevation bands utilizes a limited set of colors (e.g., the color set comprises a limited set of only 8 colors). In one such arrangement, one additional color may be utilized to represent water. Therefore, in one preferred arrangement, where the observing craft, such as an aircraft that passes over bodies of water, this one additional color representing water may be chosen without respect to elevation. Preferably, terrain elevations can be rounded to a nearest length increment (e.g., meter, yard, foot, etc.) prior to any type of data computation or actual terrain representation generation. However, as those of ordinary skill will recognize, alternative arrangements may also be implemented.

Terrain Bands

For certain given displays that may be utilized with visual display 110, in one arrangement where the limited set of colors comprise 8 colors, there can be as little as one terrain band displayed, or as many as eight terrain bands displayed (perhaps 9 terrain bands if a terrain band for water is included). In one preferred arrangement, Band 0 will represent a lowest terrain in view on the display. In such an arrangement, the other necessary bands are added to Band 0 to represent the higher elevation terrains under view. Preferably, the various bands of the limited color set may be labeled herein as follows:

Band 0 First assigned elevation level, always used, represents lowest terrain in view (i.e., MIN);
Band 1 Second assigned elevation level. Such a second assigned elevation level may be used if a displayed elevation variation is greater than or equal to 1,000 feet, such that a band does not represent less than a certain, meaningful, pre-defined elevation variation, in this case 500 feet of elevation variation;
Band 2 Third assigned elevation level. Such a third assigned elevation level may be used if displayed elevation variation is greater than or equal to 1,500 feet;
Band 3 Fourth assigned level. Such a fourth assigned elevation level may be used if displayed elevation variation is greater than or equal to 2,000 feet;
Band 4 Fifth assigned level. Such a fifth assigned elevation level may be used if displayed elevation variation is greater than or equal to 2,500 feet;
Band 5 Sixth assigned level. Such a sixth assigned elevation level may be used if displayed elevation variation is greater than or equal to 3,000 feet;
Band 6 Seventh assigned level. Such a seventh assigned elevation level may be used if displayed elevation variation is greater than or equal to 3,500 feet;
Band 7 Eighth assigned level. Such an eighth assigned elevation level may be used if displayed elevation variation is greater than or equal to 4,000 feet.

In the exemplary color set described above, where the limited set of colors comprises 8 colors, there can be as little as one terrain band displayed. Alternatively, there may be as many as eight terrain bands displayed (perhaps 9 terrain bands if a terrain band for water is included). As those of ordinary skill in the art will recognize, alternative arrangements may be implemented as well.

Terrain Colors

For any given display, such as the display generally described above, colors will be assigned to the terrain bands, and there can be as few as one terrain color or as many as eight terrain colors simultaneously displayed (perhaps 9 terrain bands if a terrain band for water is included). Any given elevation or terrain band will be represented by a single color, but the color assigned to that specific terrain band may vary. For instance, if only Band 0 is displayed by zooming in at the shore of the earth's Dead Sea (lowest elevation on earth), Band 0 would be represented using Color 0 (the lowest color in one preferred arrangement).

Alternatively, if only Band 0 is displayed, and for example, the terrain monitoring system zooms in at the peak of Mount Everest (the highest elevation on earth), Band 0 would be still be displayed but this time using a different color: Color 7 (the highest color in one preferred embodiment). Similarly, if only Band 0 is displayed somewhere in the middle absolute elevations (e.g., those elevations around 15,000 feet), the color chosen would be in the middle color range, i.e., Color 3 or Color 4 depending on the selection algorithm. Therefore, the color is trended, though not tied, to absolute elevation levels.

Preferably, in one arrangement, the colors may be labeled as follows:

| | |
|---|---|
| Color 0 | A Lowest terrain level displayed |
| Color 1 | |
| Color 2 | |
| Color 3 | A Middle terrain level displayed |
| Color 4 | A Middle terrain level displayed |
| Color 5 | |
| Color 6 | |
| Color 7 | A Highest terrain level displayed |

In one preferred arrangement, a decision will be made as to whether to use all colors included in the limited color set. For example, where the limited color set comprises 8 colors, a decision will be made as to whether or not the terrain elevation representation scheme utilizes all the colors contained in the limited color set. As just one example, the following equations may be utilized where a preferred arrangement utilizes all eight (8) colors. In this example, the elevations may be rounded to the nearest foot:

If MAX−MIN is greater than or equal to 4,000 feet
Then
NBD=8 (number of color bands displayed in a present display view) (use all 8 colors, i.e., 8 colors*500 foot terrain bands minimum represented by each band). To define the elevation lower and upper limits of each band that will be assigned a unique color, consider the following example.
Band 0 base elevation=MIN. That is, the minimum elevation of Band 0 would be the base of Band 0.
Band 0 top elevation=MIN+((MAX−MIN)/8))−1. That is, the maximum elevation of Band 0 would be the top of Band 0.
AND Band 0 Color=Color 0. That is, the color assigned to Band 0 is the color that represents the lowest terrain.
In similar fashion, moving up the terrain bands from Band 0:
Band 1 base elevation=Band 0 top+1
Band 1 top elevation=Band 1 base+((MAX−MIN)/8)−1
AND Band 1 Color=Color 1
Continuing this rule all the way to the top terrain band, the eighth and final terrain band may be defined as:
Band 7 base elevation=Band 6 band top+1
Band 7 top elevation=MAX
AND Band 7 Color=Color 7. That is, the color assigned to terrain Band 7 is the color that is used to represent the highest terrain on display. In the arrangement where all terrain bands and colors are to be used, no trending of terrain to lower, higher, or middle absolute elevations is necessary.

Alternatively, the present method and system may utilize less then 8 colors for terrain representation. For example, in one arrangement, the method and system for terrain generation may be configured such that it does not allow a single color to represent less than a certain altitude range, such as, for example, less than 500 feet in altitude. For example, if one were flying over a certain land mass that has a relatively low degree in terrain fluctuation or elevation variation, such as may occur while traveling over portions of the state of Iowa in the United States of America, the terrain elevation would only vary by approximately 1,200 feet from the terrain maximum MAX to the terrain minimum MIN.

For the flying task, it would appear to be difficult to illustrate or represent this slight maximum and minimum elevation variation (i.e., 1,200 foot terrain difference) with a set of eight different colors. For example, eight colors would tend to over-emphasize the terrain variation appropriate for the flying task. Rather than represent this 1,200 feet variation with eight different colors, a more limited or restricted number of colors are utilized. For example, in such a terrain generation, a total of only two different colors may be sufficient. In such an arrangement, each color would represent about 600 feet of elevation variation.

The following equations may be used by the processor 106 in such an arrangement where a more limited or restricted number of colors are utilized for terrain generation:
If MAX−MIN<4,000 feet
Then
NBD=Floor (MAX−MIN)/500 (NBD=the greater of 1 of Floor (MAX−MIN)/500). In this equation, a Floor function may be used to eliminate decimals, and require at least 500 feet of altitude variation per terrain band.

Consequently, in the example above where the difference in elevation is only 1,200 feet, NBD or the number of colors bands displayed, would equal only two colors. The number of bands, and colors, would not increase until the elevation variation (MAX−MIN) equaled or exceeded 1,500 feet.

Once it has been decided that a limited set of colors will be used, it must be decided which of the two colors in the color set of eight colors that should be chosen. In one preferred scenario, one could first use the colors that most closely represent the elevations if the subject terrain with reference to the overall colors used were all the elevations of the earth under analysis. Therefore, in the example of flying over Iowa, the system would be expected to use two colors that are weighted more toward the lower terrain side of the overall terrain scale.

Consider that the lowest point on earth is (1,312) feet mean sea level at the Dead Sea, and +29,035 feet mean sea level at the peak of Mount Everest, for 30,347 feet of total elevation variation over the surface of the earth. To represent this total elevation variation using only a limited color set, such as eight colors, each color would represent approximately 3,793 feet of elevation variation (30,347 feet divided by eight colors). To remove the sign error from the sub-sea level elevations, and to remove the potential for returning a zero result, the Dead Sea may be set to an elevation of 0 and the peak of Mount Everest is set to 30,347 feet for the present discussion.

How the processor 106 chooses which colors to display on visual display 110 is based on the number of colors displayed (NCD), such that no color is used to visualize less than 500 feet of altitude variation, as well as the relative weighting of colors toward lower, middle, or higher elevations. For instance, if for a given display the number of colors to display is three, based on for instance a 1,600-1,900 feet of altitude variation from highest MAX to the lowest elevation point MIN on the display, it is possible that the elevation variations could become weighted (i.e., colored) toward lower terrain elevations, such as those around Death Valley, or certain higher terrain elevations, such as those elevations around Mount McKinley.

Therefore, the MIN, MID, or MAX Bands are preferably colored in such a way as to represent a general terrain elevation of the display as if considered in the context of the entire earth. For Death Valley, the minimum terrain elevation MIN, represented by Band 0 could represent a color weighted toward the color of the absolute elevation displayed in the context of the entire earth, and thus the lowest colors of the 8 colors used could be used to represent this lowest band. In this manner, if a total of three colors are needed, two other bands could be added with the next highest colors. Alternatively, for Mount Everest, one could take a maximum terrain elevation displayed MAX, and use a highest color to represent this highest band displayed band, then use two other color bands with the next lowest colors, allowing the lowest color band to represent MIN or Band 0. For terrain in the middle elevations, that is, for terrain ranging from about 10,000 feet to about 20,000 feet, for instance, the colors could be selected from the middle of the color set and centered about the midpoint terrain elevation in view MID.

In one alternative weighting arrangement, the processor 106 could assign 8 colors as if the whole world were being viewed. The weighting arrangements noted below are merely exemplary as alternative arrangements may also be used:

| Terrain Elevation Bands | Color |
|---|---|
| 30347 feet | 7 |
| 26554 feet | |
| 26553 feet | 6 |
| 22761 feet | |
| 22760 feet | 5 |
| 18967 feet | |
| 18966 feet | 4 |
| 15174 feet | |
| 15173 feet | 3 |
| 11381 feet | |
| 11380 feet | 2 |
| 7587 feet | |
| 7586 feet | 1 |
| 3794 feet | |
| 3793 feet | 0 |
| 0 | |

Next, one could take a midpoint of the terrain elevation in view. A comparison would be made with the terrain elevation bands, and the color bands in the above table. The terrain elevation band in which the midpoint fell would define the middle color band to be used, and colors to represent the terrain elevation bands above and below the midpoint would be defined as the next colors above and below the midpoint color, until all required color bands were represented. For instance, with 5 color bands required, the midpoint would be defined as the middle band (band 2), with two bands below (band 1 and band 0) and two bands above (band 3 and band 4).

In one arrangement, if an even number of bands are indicated, a rule could be used to define the midpoint as a middle band weighted toward the higher side if the midpoint is above 15173.5 feet, and conversely as a middle band weighted toward the lower side if the midpoint is below 15173.5 feet. For instance, if 4 bands are indicated and the midpoint is above 15173.5 feet, the middle band could be defined as band 2, with band 3 above and band 1 and band 0 below, thus trending the colors toward higher terrain.

Alternatively, for an even number of bands, the processor 106 could also have a defined rule in which midpoints were always specified as a middle band weighted toward either the higher or lower side regardless of relative positioning to the middle of all terrain on earth.

Finally, if the case were reached where colors topped or bottomed out (i.e., all elevations were not accommodated because the final top or bottom color was used prior to the top or bottom elevation being represented), the system could shift the color bands up or down until the top or bottom elevation band was correctly assigned a color, and all elevation bands were displayed.

Static and Dynamic Terrain Representation

Figure 2:
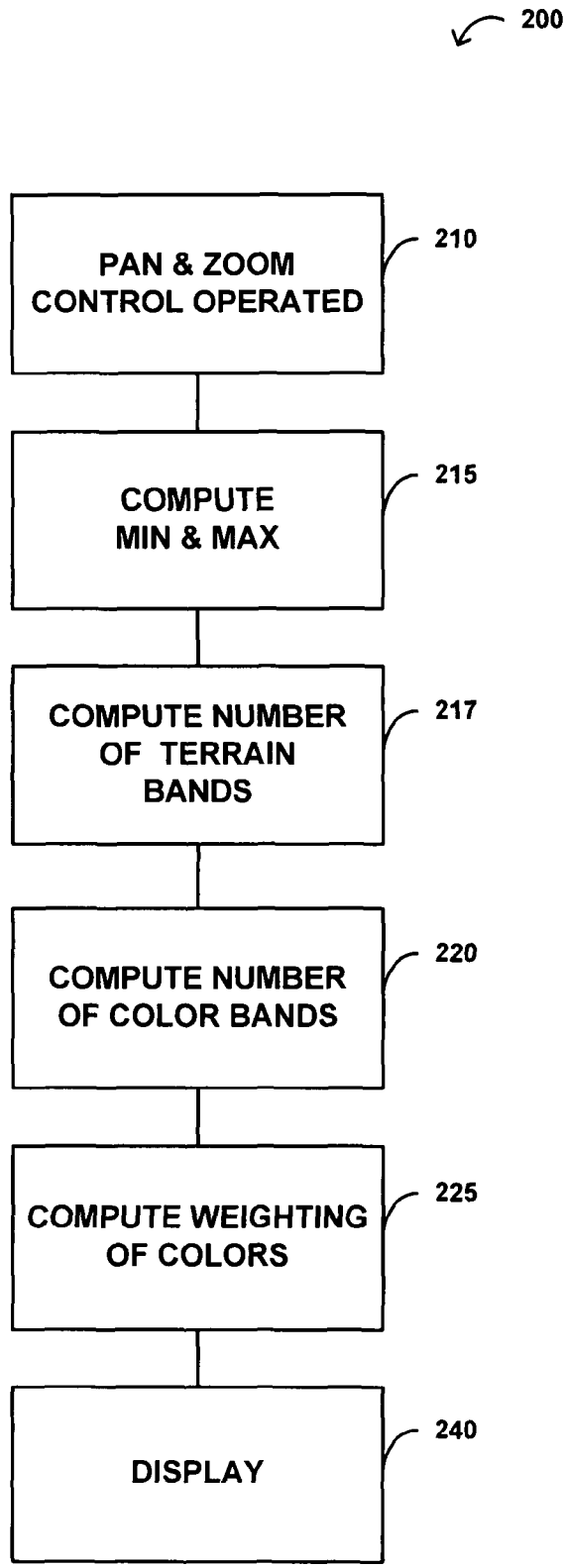
FIG. 2 illustrates a general block diagram for the terrain generation system of FIG. 1 utilizing a preferred static mode of terrain representation generation.
Figure 3:
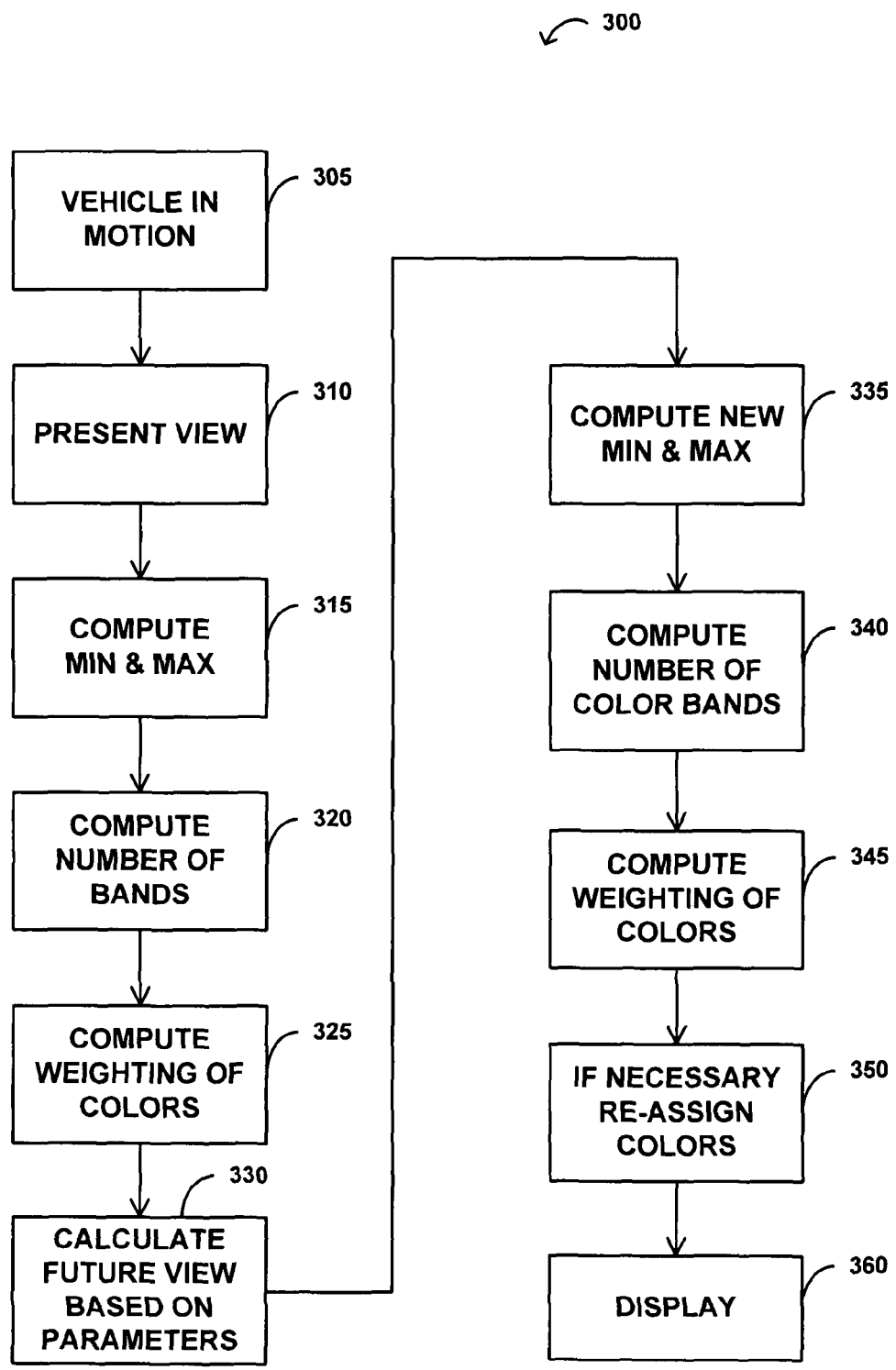
FIG. 3 illustrates a general block diagram for the terrain generation system of FIG. 1 utilizing a preferred dynamic mode of terrain representation generation.

The presently disclosed system and method of generating a terrain representation may operate in a variety of modes. In one arrangement, the disclosed system and method operates in a static mode (i.e., a present view). In static mode, the system accounts for the terrain in the present view, i.e., the system uses values of MIN, MID, and MAX as displayed in the map, according to a range or zoom level selected. In an alternative arrangement, the system and method operates in a dynamic mode (i.e., a future view). FIG. 2 illustrates a general block diagram for terrain generation utilizing a preferred static mode whereas FIG. 3 illustrates a general block diagram for terrain generation utilizing a preferred dynamic mode. The processor 106 illustrated in FIG. 1 determines, with input preferably from the input device 110 and sensor data 102 the operating mode.

In a preferred static mode block diagram 200 is illustrated in FIG. 2. In the first step, a pan and zoom control is operated 210 (preferably via input device 110). In this manner, a particular area of interest of the subject terrain may be selected and then magnified. Based on the view selected in a display window, the minimum terrain elevation displayed MIN and the maximum terrain elevation displayed MAX elevations are computed at step 215 (preferably via processor 106). After the minimum terrain elevation displayed MIN and the maximum terrain elevation displayed MAX elevations are computed at step 215, the number of terrain bands may be established at step 217 (preferably via processor 106). The number of color bands is then computed at step 220. Next, a weighting of the colors is computed at step 225, and then finally a display at step 240 is generated and displayed via visual display 110. This display will then represent the terrain by assigning colors to the various bands.

When an operator (such as user 112, i.e., an aircraft pilot or other operating personnel) changes pan and zoom, the minimum terrain elevation displayed MIN and the maximum terrain elevation displayed MAX elevations are re-initiated. In this manner, a new assignment of color bands may be accomplished based on the following criteria: a new minimum terrain elevation displayed MIN, a new maximum terrain elevation displayed MAX elevation, the number of color bands to be utilized, and/or the weighting of colors toward the higher, middle, or lower elevation colors.

A preferred dynamic mode block diagram 300 is illustrated in FIG. 3. In the first step of the preferred dynamic mode 300, a terrain generating vehicle (e.g., an aircraft) is in motion 305, and there is a present view of a targeted terrain generated at any given point in time 310. A first MIN and MAX value is computed at step 315. Based on these computed values, the number of color bands is computed at step 320. Next, a weighting of the colors is computed at step 325, and a future view is generated based on certain parameters at step 330. To calculate this future view, a new MIN and MAX is computed at step 335. Based on these new MIN and MAX values, new color bands are computed at step 340 and a new weighting of these color bands occurs at step 345. If necessary, the system will re-assign these colors at step 350 and then these colors are then displayed at step 360. Again, all such process steps are preferably accomplished via processor 106. The visual display, displayed via visual display 110, will then represent the terrain by assigning colors to the various bands.

In this manner, in the dynamic mode process 300 illustrated in FIG. 3, the method and system will account for a second view or a future view of the targeted terrain, because as the terrain generating vehicle traverses over the terrain surface, the new minimum terrain elevation displayed MIN and the new maximum terrain elevation displayed MAX elevations generated at step 335 will probably be changing as the terrain changes. Therefore, in accordance with one objective of such a dynamic mode, the method and system efficiently transitions from a first or present view to a second or future view and does so preferably without creating drastic color changes for the system operator. The first or present view (as generated at step 310), then, may use a slightly larger terrain area than that displayed to compute the minimum terrain elevation displayed MIN and the new maximum terrain elevation displayed MAX values.

For instance, the present system and method may take into account terrain elevations several minutes into the future in order to filter out rapid color or hue shifts. Further, the system may compute how the terrain bands and/or colors of a first or present view will change, given a predicted terrain view several minutes into the future. This could be based in part on a vehicle's planned route, a vehicle's speed over a specific terrain surface, or some other operating parameter such as altitude, roll rate, pitch rate, acceleration, deceleration, flight plan, track, heading, or other like or similar parameter.

Over this time interval, then, the system may shift colors and could shrink or expand certain terrain bands in order to change from the first or present view to the second or future view without coarse or sudden shifts in terrain representation coloration. For instance, if the present view is using 8 colors to represent 4,000 feet in variation, and a future view (e.g., a view that may occur 5 minutes in the future) will use the same 8 colors to represent 8,000 feet of elevation variation (perhaps even with a different MID value), the system that smoothly expands the color bands, frame-by-frame over a 5 minute interval may be preferred to the system that simply shifts colors in real time according to a present view. Such an approach would likely be preferred in cases where a sudden or precipitous terrain elevation variation change occurs. In dynamic mode, the system may account for both the terrain at the time interval in the future, as well as all of the terrain views leading up to the future view.

Accordingly, the system can also accommodate an algorithm to track rate of elevation variation over unit time. If the algorithm determines that the rate of change over unit time is gradual, such as 4,000 to 4,050 feet of elevation variation over 5 minutes, the system may continue to operate in static mode indefinitely. However, if a sharp change in elevation variation is detected per unit time, such as the 4,000 to 8,000 elevation variation over 5 minutes, the system may enter dynamic mode and begin smoothly shifting colors to represent the elevation variation from the present view to the future view.

As just one example, as an aircraft in flight approaches the Grand Canyon from a basically flat landform 50 miles to the south (and with the Grand Canyon not yet visible), the basically flat terrain leading up to the Grand Canyon might conceivably and gradually darken (i.e., move towards higher color bands representing higher terrain elevations even though there appears to be no immediate change in viewed terrain elevation) in anticipation of the need to show lower terrain bands and colors as the edge of the Grand Canyon is approached. This darkening effect (i.e., shift toward colors that represent a higher terrain elevation) may occur even as the terrain height of the basically flat landform leading up to the Grand Canyon is generally constant. Rather, in one arrangement, such a darkening affect can occur as the system represents new altitude variations using the limited color set, based on the second or future view having the new minimum terrain elevation displayed MIN and maximum terrain elevation displayed MAX altitudes as inherent in the Grand Canyon. One advantage of such a dynamic system is to smoothly, and gradually flow the terrain bands and colors from the first or present view to the second or future view. This gradual flow may be accomplished by determining the terrain coloration for a given present view, projecting from this up to and including a future view, determining the terrain coloration up to and including this given future view, and then smoothly re-assigning colors to elevation levels, frame-by-frame, over unit time period from the present view to the future view.

Exemplary embodiments of the present invention have been described. Those skilled in the art will understand, however, that changes and modifications may be made to these embodiments without departing from the true scope and spirit of the present invention, which is defined by the claims.

As just one example, in an alternative arrangement, the system could allow for a smooth assignment of colors. In this arrangement, the hue would be held constant while the saturation and/or luminance could be varied in a continuous (rather than stepwise) fashion. The algorithm for this is essentially the same as described above. First, a MIN, MID, and MAX is determined and a min/mid/max for the region being depicted. One could choose a base saturation and/or luminosity from a predefined range. The saturation and/or luminosity could then be proportionally but smoothly varied to the altitude. One advantage of such an arrangement is that it makes gradual transitions (as described in the dynamic mode) occur in a seamless manner.

We claim:

1. A method of generating a representation of a terrain, said method comprising the steps of:
   storing a set of colors in a storage device, said set of colors comprising at least a plurality of colors;
   selecting a limited set of discrete colors from the set of colors; and
   in a processor that is in operable communication with the storage device:
   determining a minimum terrain elevation;
   determining a maximum terrain elevation;
   computing a plurality of terrain bands based in part on said limited set of colors, said minimum terrain elevation, and said maximum terrain elevation;
   assigning at least one of said limited set of colors to each of said plurality of terrain bands;
   generating said representation of said terrain utilizing at least one of said limited set of colors; and
   selectively accounting for a view of a future terrain to thereby transition from a present view of the terrain to a view of the future terrain, wherein the future terrain is different from the terrain.

2. The method of claim 1 further comprising the step of displaying said terrain representation on a display device that is in operable communication with the processor.

3. The method of claim 1 wherein said step of determining a minimum terrain elevation further comprises the step of determining a minimum displayed terrain elevation.

4. The method of claim 1 further comprising the steps of:
generating a first display of a first terrain view,
generating a second display of a second terrain view, and
utilizing no coarse color changes between said first and said second display.

5. The method of claim 1 further comprising the step of determining whether to utilize more than one of said plurality of said colors to represent said terrain representation.

6. The method of claim 1 further comprising the step of defining a terrain band minimum for at least one of said terrain bands.

7. The method of claim 1 further comprising the step of defining a terrain band maximum for at least one of said terrain bands.

8. The method of claim 1 further comprising the step of not allowing a single color to represent less than a certain range of altitude.

9. The method of claim 1 further comprising the step of accounting for a future view of said terrain to thereby transition from a present view of the terrain to a future view of said terrain without creating coarse color changes in said generated display.

10. The method of claim 1 further comprising the step of generating said view of said future terrain based in part on a planned route.

11. The method of claim 1 further comprising the step of generating said view of said future terrain based in part on a speed of a vehicle over said planned route.

12. The method of claim 1 wherein said terrain representation is generated in a terrain generating vehicle.

13. The method of claim 1 wherein said terrain representation is displayed in a terrain generating vehicle.

14. The method of claim 12 wherein said terrain generating vehicle comprises an aircraft.

15. The method of claim 1 further comprising the step of determining an altitude of a vehicle or course of said vehicle.

16. The method of claim 1 wherein said color set comprises 5 to 10 colors.

17. The method of claim 1 wherein one of said colors of said color set represents water.

18. The method of claim 1 wherein each color in said color set is defined so as not represent less than a certain range of altitude.

19. The method of claim 18 wherein said certain range of altitude comprises approximately from 200 to 400 feet.

20. A system for generating a representation of a terrain, the system comprises:
a data storage device having stored therein a set of selected colors, the set of colors comprising at least a plurality of colors; and
a computer in operable communication with the data storage device that calculates a minimum terrain elevation and a maximum terrain elevation, said computer being configured to compute a plurality of terrain bands based in part on the set of colors, the minimum terrain elevation, and the maximum terrain elevation, said computer further configured to selectively account for a view of a future terrain to thereby transition from a present view of the terrain to a view of the future terrain without creating course color changes in a generated display, the future terrain being different from the terrain,
wherein at least one of said set of colors is assigned to each of said plurality of terrain bands, and
wherein said system generates said representation of said terrain utilizing at least one of said set of colors.

* * * * *